United States Patent
Hua et al.

(10) Patent No.: US 11,349,568 B2
(45) Date of Patent: May 31, 2022

(54) SYSTEM AND METHOD FOR OPERATING A SYSTEM INCLUDING A FIRST COMMUNICATIONS UNIT AND A SECOND COMMUNICATIONS UNIT

(71) Applicant: SEW-EURODRIVE GMBH & CO. KG, Bruchsal (DE)

(72) Inventors: Zhidong Hua, Bruchsal (DE); Manuel Hoffmann, Brackenheim (DE); Viktoriya Zavalishka, Mannheim (DE); Thomas Schäfer, Karlsdorf-Neuthard (DE); Michael Lindenfelser, Bruchsal (DE); Andreas Wanjek, Waghäusel (DE)

(73) Assignee: SEW-EURODRIVE GmbH & Co. KG, Bruchsal (DE)

( * ) Notice: Subject to any disclaimer, the term of this patent is extended or adjusted under 35 U.S.C. 154(b) by 0 days.

(21) Appl. No.: 17/273,398

(22) PCT Filed: Aug. 23, 2019

(86) PCT No.: PCT/EP2019/025282
§ 371 (c)(1),
(2) Date: Mar. 4, 2021

(87) PCT Pub. No.: WO2020/048635
PCT Pub. Date: Mar. 12, 2020

(65) Prior Publication Data
US 2021/0344420 A1 Nov. 4, 2021

(30) Foreign Application Priority Data
Sep. 4, 2018 (DE) .......................... 102018006988.6

(51) Int. Cl.
*H04B 10/116* (2013.01)

(52) U.S. Cl.
CPC .................................. *H04B 10/116* (2013.01)

(58) Field of Classification Search
CPC .................................................... H04B 10/116
(Continued)

(56) References Cited

U.S. PATENT DOCUMENTS 9,847,835 B2    12/2017   Yamasaki et al.
10,177,848 B1 *   1/2019   Ramer ................. H04B 10/116
(Continued)

FOREIGN PATENT DOCUMENTS

DE    102016102119 A1    9/2016
DE    102015015898 B4    12/2016
(Continued)

OTHER PUBLICATIONS

International Search Report issued in corresponding International Application No. PCT/EP2019/025282, dated Nov. 8, 2019, pp. 1-3, English Translation.

*Primary Examiner* — Dalzid E Singh
(74) *Attorney, Agent, or Firm* — Carter, DeLuca & Farrell LLP

(57) ABSTRACT

A system includes a first communications unit, e.g., a transmitter, and a second communications unit, e.g., a receiver. The first communications unit has a controllable illumination device, which emits light modulated according to a predefined data flow, and the second communications unit has a camera, including an optical element and an image sensor. A light-sensitive surface of the image sensor has a plurality of lines of light-sensitive elements, and the image sensor is arranged such that the image of the illumination device projected onto the light-sensitive surface of the image sensor by the optical element is unsharply imaged and/or covers more than half of the light-sensitive surface and is scanned line by line, e.g., so that the image has stripes of (Continued)

different brightness and/or that the brightness profile induced transversely to the line direction spatially indicates the time characteristic of the data flow.

26 Claims, 6 Drawing Sheets

(58) Field of Classification Search
USPC .......................................................... 398/116
See application file for complete search history.

(56) References Cited

U.S. PATENT DOCUMENTS

| | | | |
|---|---|---|---|
| 10,191,140 B2 * | 1/2019 | Li | G01C 21/206 |
| 2009/0052902 A1 | 2/2009 | Shinokura | |
| 2014/0286644 A1 | 9/2014 | Oshima et al. | |
| 2016/0323035 A1 * | 11/2016 | Jovicic | H04N 5/3532 |
| 2017/0244482 A1 * | 8/2017 | Dimare | H04K 1/00 |
| 2019/0158179 A1 * | 5/2019 | Davies | H05B 45/10 |

FOREIGN PATENT DOCUMENTS

| | | | | |
|---|---|---|---|---|
| EP | 2811668 A1 | 12/2014 | | |
| WO | 2012127439 A1 | 9/2012 | | |
| WO | 2016001339 A1 | 1/2016 | | |
| WO | WO-2016001339 A1 * | 1/2016 | ........... | H04B 10/116 |
| WO | 2016128967 A1 | 8/2016 | | |
| WO | 2016187328 A1 | 11/2016 | | |

* cited by examiner

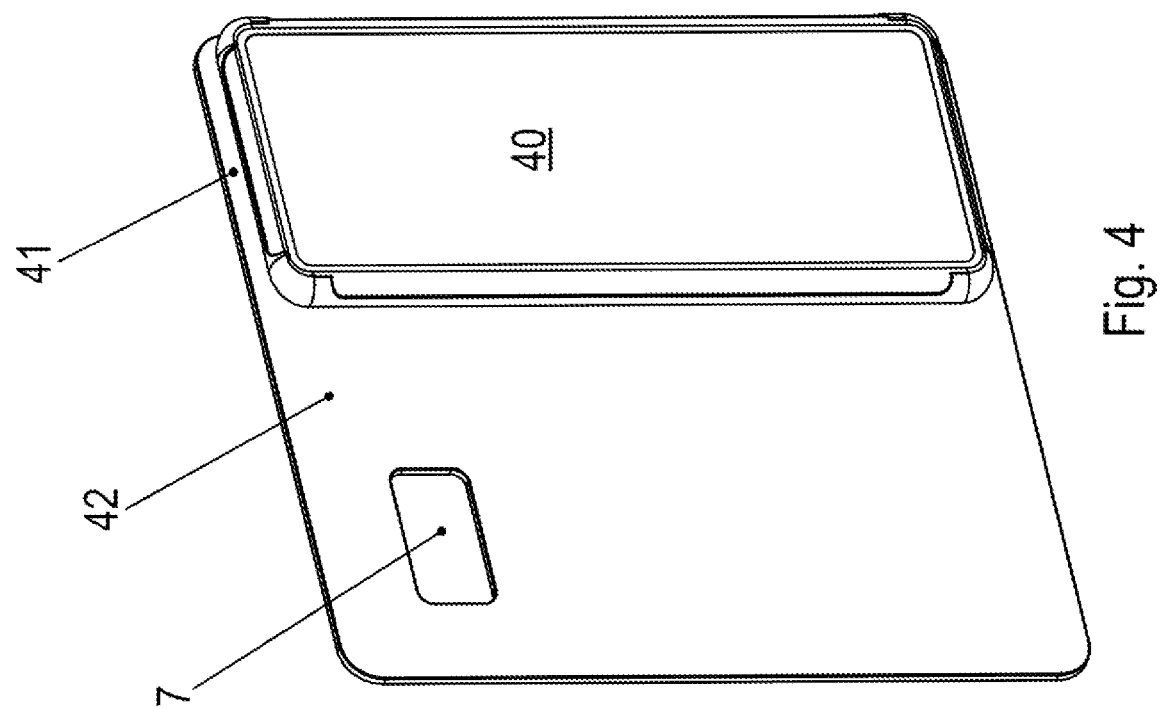

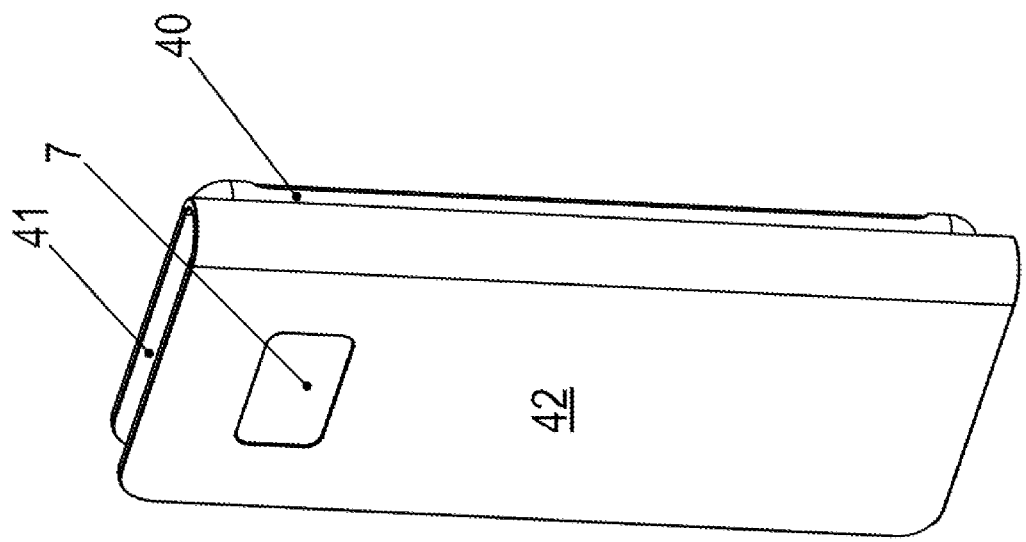

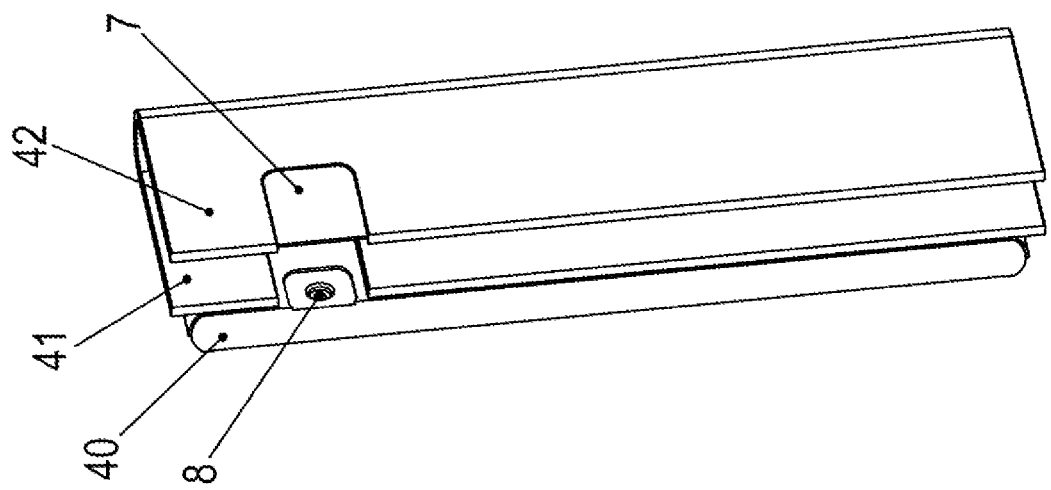

SYSTEM AND METHOD FOR OPERATING A SYSTEM INCLUDING A FIRST COMMUNICATIONS UNIT AND A SECOND COMMUNICATIONS UNIT

FIELD OF THE INVENTION

The present invention relates to a system and a method for operating a system including a first communications unit and a second communications unit.

BACKGROUND INFORMATION

In certain conventional systems, a smartphone functions as a communications unit, in which case a mobile radio connection is established to the smartphone. In addition, in certain conventional systems, application programs, in particular, referred to as apps, can be processed on smartphones and images are able to be recorded using a camera of the smartphone.

German Patent Document No. 10 2015 015 898 describes a data transmission method in which a camera is used as the receiver.

U.S. Patent Application Publication No. 2014/0286644, in particular, its figure, describes an information method and an associated system.

PCT Publication No. WO 2016/187328 describes a power beam transmission.

PCT Publication No. WO 2012/127439 describes a light detection method.

PCT Publication No. WO 2016/0128967 describes a method for transmitting optically coded information.

U.S. Patent Application Publication No. 2009/0052902 describes a communications system.

SUMMARY

Example embodiments of the present invention provide a system having communications units in which a data flow is to be detected in a reliable manner.

According to an example embodiment of the present invention, a system includes a first communications unit, e.g., a transmitter, and a second communications unit, e.g., a receiver. The first communications unit has a controllable illumination device, which emits light that is modulated according to a predefined data flow, and the second communications unit has a camera, which includes an optical element and an image sensor. A light-sensitive surface of the image sensor has a plurality of lines of light-sensitive elements, and the image sensor is arranged such that the image of the illumination device projected onto the light-sensitive surface of the image sensor by the optical element is imaged unsharply and/or covers more than half of the light-sensitive surface and is scanned line by line, for example, so that the image has stripes of different brightness and/or so that the brightness profile induced transversely to the line direction spatially indicates the time characteristic of the data flow. Each stripe, for example, covers subregions of lines, and the second communications unit includes a lenticular film, which is situated between the optical element and the first communications unit.

This has the advantage that a data transmission method in which a camera is used as a receiver is further refined. It is also possible to obtain a reliable detection of the transmitted data flow. For this purpose, the illumination device is unsharply imaged such that the image does not have a punctiform characteristic but covers a large portion of the sensitive surface. In this manner, the projected image of the illumination device is striped as a result of the scanning, carried out in series over time, of the sensitive elements situated in the respective lines of the sensitive surface. Because of the large-area, unsharp representation of the illumination device, the striped regions of the sensitive surface are likewise large and therefore have a lower error rate in the image evaluation. The spatial brightness profile transversely to the line direction is thus able to be determined with very few errors.

According to example embodiments, the optical element is a converging lens, and the image distance, i.e., in particular, the distance between the illumination device optical element, and the object distance, i.e., in particular, the distance between the optical element and the light-sensitive surface, in relation to the focal length of the converging length is such that the image of the illumination device is unsharp, especially unsharp such that, transversely to the line direction, the image covers more than 20 percent, in particular more than 50 percent, of the extension of the light-sensitive surface transversely to the line direction. This offers the advantage that an existing smartphone can be used provided the camera is arranged and operated such that the converging lens of the camera images in an unsharp manner. Therefore, the spatial brightness profile transversely to the line direction is once again able to be determined with a low error rate.

According to example embodiments, the optical element is a dispersion lens, the image distance, i.e., in particular, the distance between the illumination device optical element, and the object distance, i.e., in particular, the distance between the optical element and the light-sensitive surface, in relation to the focal length of the converging lens are such that the image of the illumination device is unsharp, in particular, unsharp such that, transversely to the line direction, the image covers more than 20 percent, in particular, more than 50 percent, of the extension of the light-sensitive surface transversely to the line direction. This offers the advantage that a dispersion lens is able to be used instead of a converging lens or that a dispersion lens whose refractive power is greater in its amount than that of the converging lens is able to be positioned in very close proximity to this converging lens so that the lenses jointly form a dispersion lens. The illumination device thus is imaged in an unsharp manner and the image detected in the form of stripes is able to be evaluated. The spatial brightness profile transversely to the line direction can be determined with a low error rate.

According to example embodiments, the second communications unit has a lenticular film, which is situated between the optical element and the first communications unit. For example, the preferred direction of the lenticular film is aligned transversely to a connecting line between the illumination device and the optical element. This has the advantage that the image is projected in elongated form in the preferred direction. In other words, an unsharp imaging of the illumination device is achieved in the process so that the image detected in striped form is able to be evaluated. The spatial brightness profile transversely to the line direction is able to be determined with a low error rate in the signal electronics.

According to example embodiments, the image sensor particularly is arranged such that the light-sensitive surface of the image sensor is scanned line by line, and this scanning of the light-sensitive surface with an image frequency is repeated over time in a recurrent manner. This has the advantage that the image is scanned in series, which means that bright and dark regions thus alternate according to the time characteristic transversely to the line direction.

According to example embodiments, the system is dimensioned such that the image of the illumination device is unsharp, in particular, unsharp such that, transversely to the line direction, the image of the illumination device covers more than 20 percent, in particular more than 50 percent, of the extension of the light-sensitive surface transversely to the line direction, and/or the image covers more than 50 percent of the light-sensitive surface. This has the advantage that a respective stripe covers a portion of the light-sensitive surface such that a determination of the brightness profile of the stripes extending transversely to the line direction can be carried out with very few errors. This is because an evaluation related to a first surface allows for a larger data quantity to be determined per image than an evaluation related to a second surface when the second surface is smaller than the first surface.

According to example embodiments, the second communications unit has a portable communications device, in particular, a smartphone having a camera, a tablet, smartwatch, or laptop, and a holder unit, which has a first and a second part. The first part is situated so as to be movable relative to the second part, in particular, situated so as to be rotatable, pivotable, and/or displaceable. The portable communications device is accommodated in the first part, and the lenticular film is accommodated in the second part. The holder unit, for example, is a smartphone case or a smartphone pocket. This offers the advantage that the holder unit can be arranged as a case which has two covers that are pivotable relative to each other, that is to say, a first part and a second part. In a first pivot position, the lenticular film thus covers the lens of the camera of the portable communications device, in particular, the smartphone or tablet, whereas the lenticular film does not cover the lens of the camera of the portable communications device, in particular, the smartphone or tablet, in a different pivot position.

According to example embodiments, the time characteristic of the data flow based on which the illumination device is actuated is displayed as a spatial brightness profile in the column direction and/or in the transverse direction to the line direction of the image sensor, of the image detected by the camera. For example, the characteristic of the brightness of a single scanned image, acquired in the column direction and averaged across the respective line, represents only a time segment of the time characteristic of the data flow transmitted by the illumination device, the time duration of the time segment, in particular, being equal to the reciprocal value of the image frequency. This has the advantage that if the data word rate is properly adapted to the image frequency, one data word per image is transmittable, which means that greater efficiency is achievable in the data transmission.

Moreover, with the aid of suitable software, the image, and thus the brightness profile, is also representable in the long term so that a long-term observation or evaluation by a viewer is able to take place. In particular, the spatial characteristic of a single image recorded by the camera represents only a time segment of the time characteristic. For example, the spatial characteristic is only located in the region of the projected image of the illumination device. The spatial characteristic is therefore easily detectable with the aid of image processing and can be allocated in an unambiguous manner.

According to example embodiments, the time characteristic of the data flow is periodic and thus has a period duration, and the image frequency during the scanning, or a whole number multiple of the image frequency during the scanning, is equal to the inverse value of the period duration. This is considered advantageous insofar as a still image is able to be displayed on the display device of the second communications unit if suitable software is used. The reason is that it is then possible to continuously display the same image at the image repetition frequency.

According to example embodiments, the second communications unit also has a controllable illumination, in particular, an LED, and the first communications unit has a further light-sensitive element, in particular, so that a bidirectional data transmission is possible between the two communications units. This has the advantage that data are also transmittable from the second to the first communications unit. A bidirectional data transmission between the first and the second communications unit is therefore able to be carried out. The first communications unit need not be arranged as a smartphone with a camera for this purpose; instead, it suffices if the signal electronics of the first communications unit is connected to a light-sensitive element.

A photodiode or phototransistor may be used as the light-sensitive element.

According to example embodiments, the second communications unit is arranged as a smartphone and/or functions as a mobile radio device, and the second communications unit, in particular, has a signal electronics and a display device, in particular, a touch-sensitive screen. This has the advantage that the first communications unit may be arranged as an electrical device, in particular, a converter for feeding an electric motor, or as an automatically moved intralogistics transport vehicle, in particular, a driverless transport system or an automatically guided vehicle. With the aid of a smartphone, the data flow transmitted from the first communications unit is therefore able to be evaluated, displayed, and/or visualized, in particular, for diagnosis purposes or for an analysis, using the smartphone. For example, it is simply necessary to hold a lenticular film in front of the lens of the camera in order to generate a large image of the illumination device, elongated in the preferred direction, and to thereby achieve an evaluation that has a low error rate.

According to an example embodiment of the present invention, in a method for operating a previously mentioned system, the difference between a threshold value and the sum of the brightness values of the light-sensitive elements, in particular, pixels, is determined for each line in the recorded image, and the sequence of the differences consequently indicates a time segment of the time characteristic of the data flow, in particular, in the form of a spatial brightness profile transversely to the line direction. The threshold value is, in particular, the mean value of the brightness values.

This has the advantage that the received data flow is easily able to be determined, i.e., extracted from the recorded image.

Further features and aspects of example embodiments of the present invention are described in greater detail below with reference to the appended schematic Figures.

BRIEF DESCRIPTION OF THE DRAWINGS

FIG. 4 is a schematic perspective view of a portable communications device in a holder unit, in particular, a case, the holder unit being open.

FIG. 5 schematically illustrates a second part of the holder unit.

FIG. 6 is an associated schematic perspective view.

DETAILED DESCRIPTION

Figure 1:
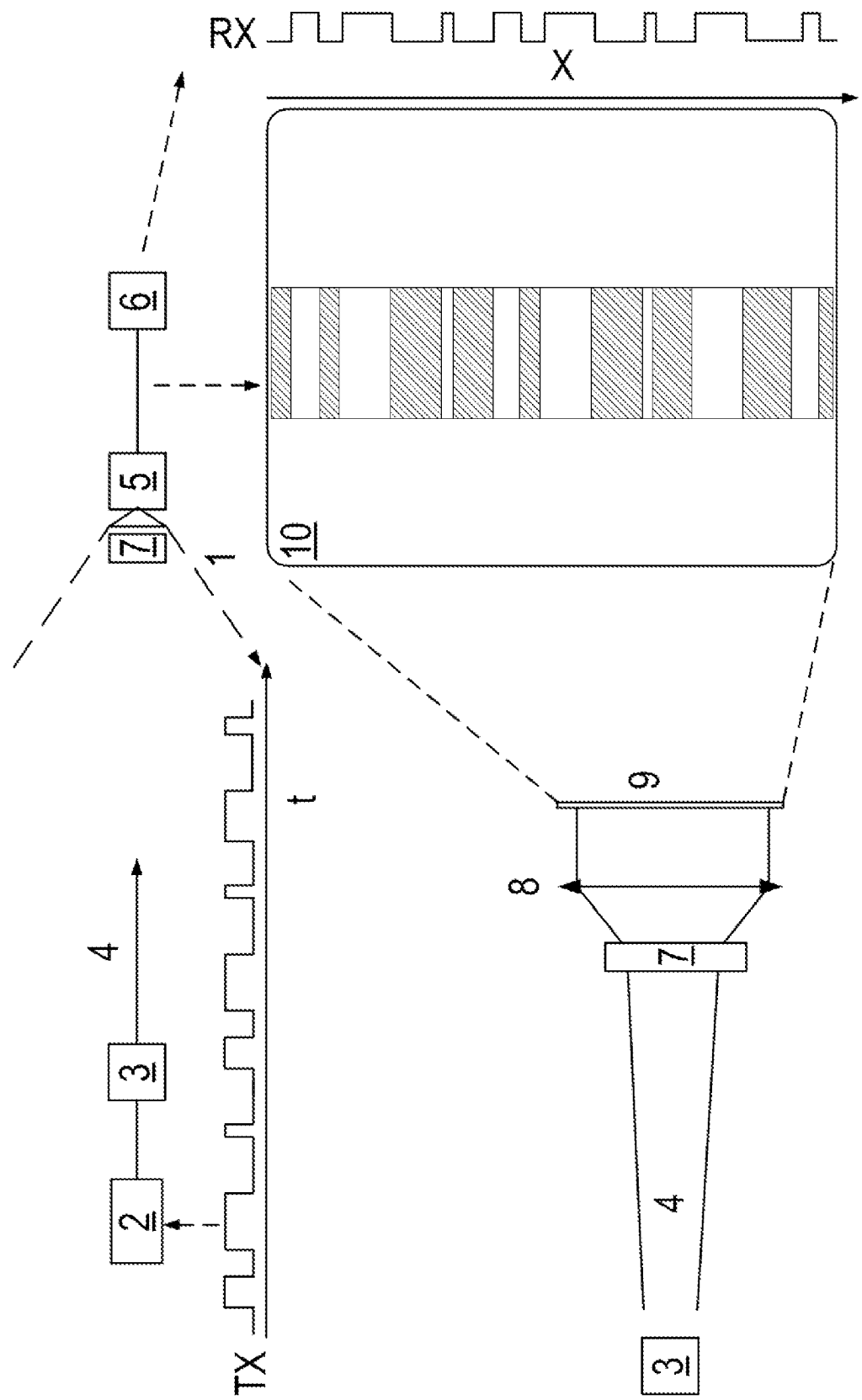
FIG. 1 schematically illustrates an exemplary embodiment according to the present invention.

As schematically illustrated in the Figures, a receiver, in particular, a portable communications device, e.g., a smartphone, has a camera which is able to detect light emitted by a controllable illumination device 3, in particular LED, of a transmitter.

The transmitter and receiver jointly form a system according to example embodiments of the present invention. The transmitter is either situated at a fixed location in a plant such as a production plant and/or a logistics plant, or it is arranged as a mobile part which autonomously moves within such a plant, in particular, in order to carry out an intralogistics task.

A signal electronics 2 actuates controllable illumination device 3 by a data flow TX illustrated in the Figures, for example. The light thus is modulated, especially actuated in a clocked manner, according to the characteristic of data flow TX.

In simplified terms, the illumination device is switched on for a first time period on a recurring time basis in each case and switched off for a subsequent second time period, so that the data bits of the data flow are transmitted one after the other.

Situated on the receiver in front of lens 8 of the camera is a lenticular film 7. The focal length and distances between illumination device 3, lens 8, and image sensor 9 of the camera are such that a sharp image of the illumination device would be recordable by the camera in the absence of lenticular film 7.

However, lenticular film 7 prevents the recording of a sharp image of illumination device 3. Instead, lenticular film 7 is positioned in such close proximity to lens 8 that image 10 of illumination device 3 is shown in elongated form parallel to the preferred direction of lenticular film 7.

Because of the line-by-line scanning of image 10 by the image sensor, i.e., in particular, the rolling shutter, image 10 is a striped image. This is because the particular lines that are scanned during the respective first time period are light and the other lines are dark. The spatial width of the stripes is substantially proportional to the respective time periods.

Illustrated to the side next to image 10 is spatial characteristic RX, which is evaluated by a signal electronics 6 connected to image sensor 5.

The horizontal frequency of the camera is greater than the inverse value of the shortest time period of data flow RX, in particular, is a whole number multiple.

If the horizontal frequency is a whole number multiple of the inverse value of the shortest time period of data flow RX, and/or the data flow is periodic in synchrony with the image frequency, then a still image 10 is created, i.e., a striped image that is invariable over time.

A film is obtainable as well if a following image is transmitted in a corresponding manner after the display of an image.

Lenticular film 7 has a preferred direction and is made of a plastic film which is positioned in a substantially flat manner. The normal direction of the plastic film is aligned in parallel with the viewing direction of the camera, that is to say, in parallel with the axis of symmetry of lens 8 of the camera, and/or a connecting line that extends from illumination device 3 to the camera.

Lenticular film 7 has raised regions whose height, i.e., in particular, also the wall thickness of lenticular film 7, is constant parallel to the preferred direction and fluctuates periodically perpendicular to the preferred direction. Transversely to the preferred direction, the wall thickness, for example, extends in the form of a semicircle or according to the amount of a sine function. Transversely to the preferred direction, the respective raised region thus has the material thickness characteristic of the cross-section of a converging lens but a constant material thickness parallel to the preferred direction.

In other words, lenticular film 7 has a constant wall thickness parallel to the preferred direction, the value of which fluctuates periodically transversely to the preferred direction, the ascending slope of each raised region, in particular, being arranged in mirror symmetry with the respective descending slope.

As illustrated in FIGS. 4 to 6, portable communications device 40 is accommodated in a first part 41 of the holder unit, in particular, a case. A second part 42, in particular, a cover flap, pivotable in relation to first part 41, is pivotably mounted relative to first part 41. In a first pivot position, i.e., in the closed state, the portable communications device can be placed in a protected manner between the first and second part 41, 42. In a second pivot position, i.e., in particular, when flipped back, first part 41 is situated between second part 42 and portable communications device 40.

In addition, a lenticular film 7 is accommodated in a recess of second part 42, the recess being positioned such that lenticular film 7 is disposed at a distance in front of lens 8 of the portable communications device in the second pivot position. When recording images, the optical path thus particularly extends through lenticular film 7 and generates the striped images for determining the transmitted data flow.

The region, covered by lenticular film 7, of distances measured to the pivot mount includes the region, covered by lens 8 of the camera, of distances measured to the pivot mount.

The holder unit is, for example, made of leather, plastic, leatherette, or imitation leather.

In contrast to FIG. 1, a dispersion lens 21 is used instead of lens 8 of the camera from FIG. 1 and lenticular film 7 is not used. Thus, the light beams emitted by illumination device 3 fill a large portion of image 20 recorded by the camera, and the determination of the stripes and the width of the stripes is possible at a reduced error rate. A data transmission that is low in errors is thereby achievable.

Figure 2:
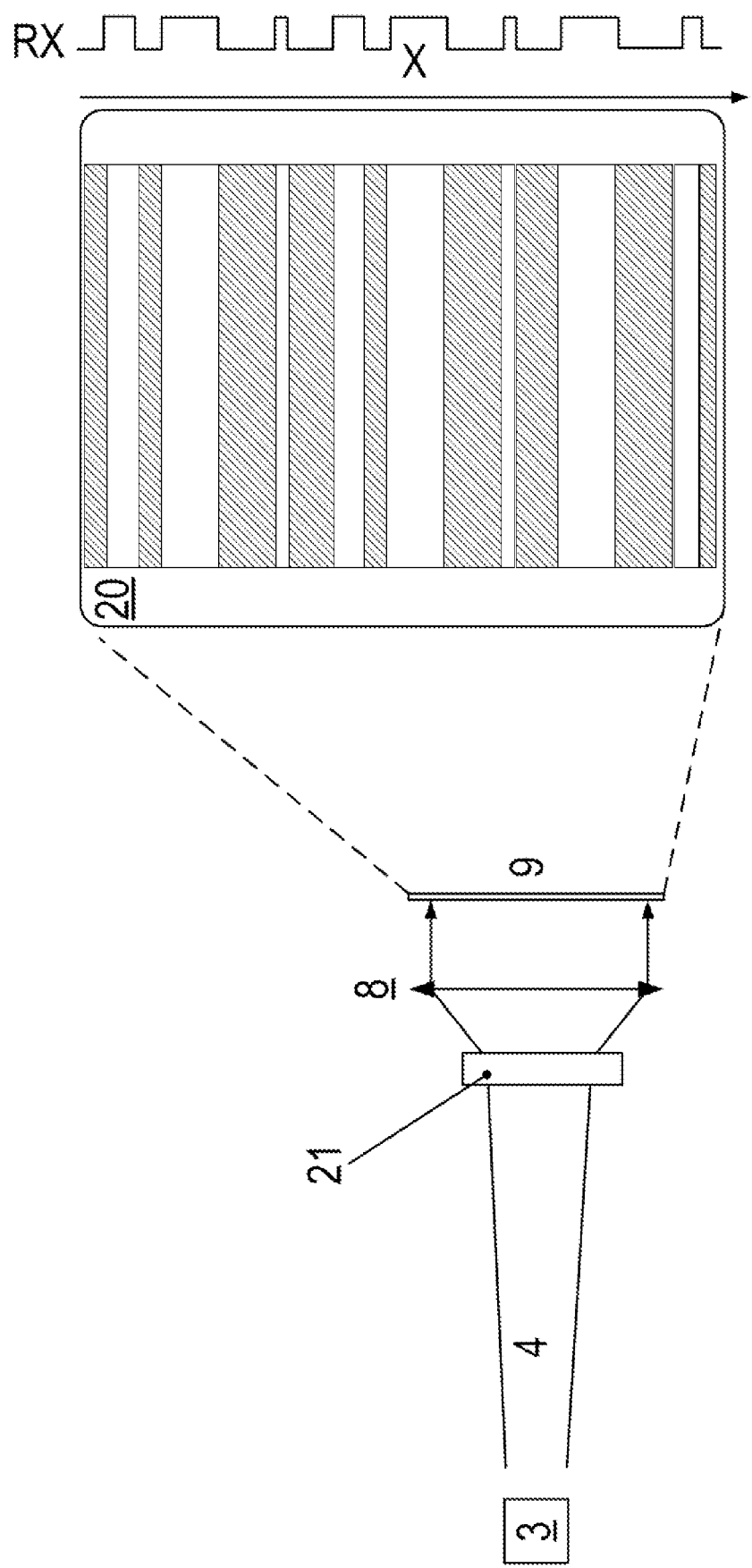
FIG. 2 schematically illustrates another exemplary embodiment according to the present invention.
Figure 3:
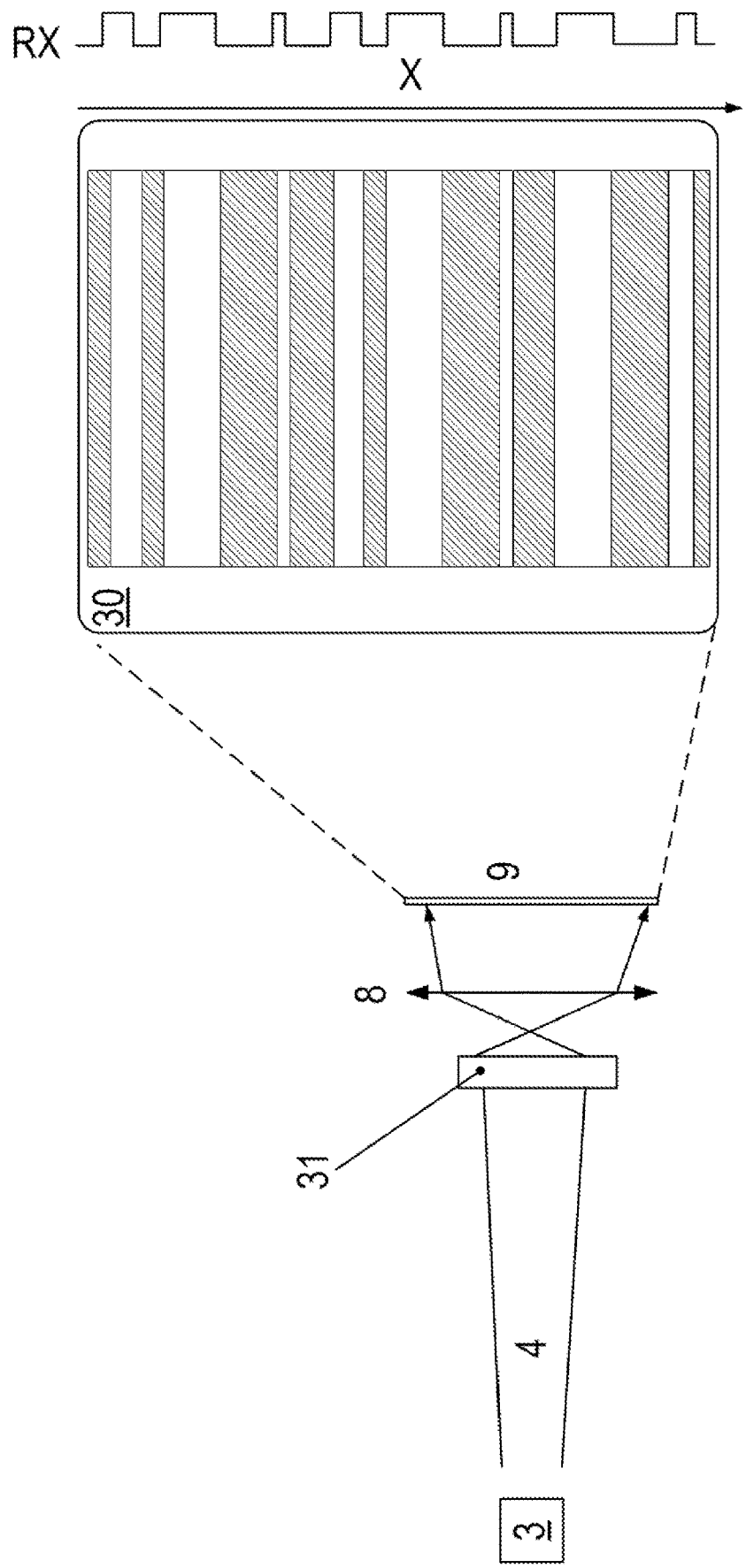
FIG. 3 schematically illustrates a further exemplary embodiment according to the present invention.

In contrast to the example embodiment illustrated in FIG. 2, a convergent lens 31 is used instead of dispersion lens 21, which, however, has a position, and thus an object distance, such that the illumination device is not sharply imaged but is imaged unsharply. The object distance is, for example, selected so that the light beams emitted by the illumination device fill a large portion of image 20 recorded by the camera. The determination of the stripes and the width of the stripes then is likewise possible at a reduced error rate. A data transmission low in errors is therefore achievable in this manner.

In further exemplary embodiments, the portable communications device also has a controllable light device, in particular, an LED. The illumination device of the communications device of signal electronics 6 of the portable communications device is arranged to establish a bidirectional communication. The transmitter additionally has a sensor which detects the light emitted by the illumination device of the portable communications device so that the received data flow is able to be evaluated and taken into account in signal electronics 2.

In further exemplary embodiments, the receiver is not a portable communications device but rather a mobile part, which independently moves in the plant, in particular, in order to carry out an intralogistics order.

In further exemplary embodiments, instead of the recurring activation and deactivation of the illumination device over time, a switch back and forth between two different intensity values takes place. However, in a further refinement . . . , it is also possible to use discrete intensity modulations. Additional modulation types such as a frequency modulation, pulse modulation, etc., may be used as well.

LIST OF REFERENCE CHARACTERS

TX time characteristic of the transmitted data flow
RX spatial representation of the time characteristic of the received data flow
1 sensitive range of camera 8, in particular, of the portable communications device, in particular, of the smartphone
2 signal electronics
3 controllable illumination device, in particular, LED
4 emitted light
5 camera
6 signal electronics including display device
7 lenticular film
8 lens
9 image sensor
10 image
20 image
21 dispersion lens
30 image
31 converging lens
40 portable communications device
41 first part of the holder unit
42 second part of the holder unit
T time
X column position

The invention claimed is:

1. A system, comprising:
a first communications unit including a controllable illumination device adapted to emit light modulated according to a predefined data flow; and
a second communications unit including a camera having an optical component and an image sensor, a light-sensitive surface of the image sensor including a plurality of lines of light-sensitive elements, the image sensor being arranged so that an image of the illumination device projected onto the light-sensitive surface of the image sensor by the optical component is unsharply imaged and/or covers more than half of the light-sensitive surface and is scanned line by line;
wherein the optical component includes a converging lens, and an image distance and an object distance in relation to a focal length of the converging lens are configured such that an image of the illumination is unsharp, that, transversely to the line direction, the image covers more than 20 percent and/or more than 50 percent of an extension of the light-sensitive surface transversely to the line direction, and/or that the image covers more than 50 percent of the light-sensitive surface.

2. The system according to claim 1, wherein the first communications unit includes a transmitter, and the second communications unit includes a receiver.

3. The system according to claim 1, wherein the image includes stripes of different brightness.

4. The system according to claim 1, wherein a brightness profile induced transversely to a line direction spatially indicates a time characteristic of the data flow.

5. The system according to claim 1, wherein each stripe covers subregions of lines.

6. The system according to claim 1, wherein the second communications unit includes a lenticular film arranged between the optical component and the first communications unit.

7. The system according to claim 1, wherein the image distance corresponds to a distance between the illumination device and the converging lens, and the object distance corresponds to a distance between the converging lens and the light-sensitive surface.

8. The system according to claim 1, wherein the second communications unit includes a lenticular film arranged between the optical component and the first communications unit.

9. The system according to claim 1, wherein the light-sensitive surface of the image sensor is adapted to be scanned line by line, scanning of the light-sensitive surface with an image frequency being repeated over time in a recurrent manner.

10. The system according to claim 1, wherein the system is dimensioned such that the image of the illumination device is unsharp.

11. The system according to claim 10, wherein the image of the illumination device is unsharp such that, transversely to the line direction, the image covers more than 20 percent and/or more than 50 percent of an extension of the light-sensitive surface transversely to the line direction and/or that the image covers more than 50 percent of the light-sensitive surface.

12. The system according to claim 1, wherein the second communications unit is arranged as a smartphone and/or a mobile radio device and/or includes a signal electronics and a display device and/or a touch-sensitive screen.

13. A system, comprising:
a first communications unit including a controllable illumination device adapted to emit light modulated according to a predefined data flow; and
a second communications unit including a camera having an optical component and an image sensor, a light-sensitive surface of the image sensor including a plurality of lines of light-sensitive elements, the image sensor being arranged so that an image of the illumination device projected onto the light-sensitive surface of the image sensor by the optical component is unsharply imaged and/or covers more than half of the light-sensitive surface and is scanned line by line;
wherein the optical component includes a dispersion lens, and an image distance and an object distance in relation to a focal length of the dispersion lens are configured such that an image of the illumination is unsharp, that, transversely to the line direction, the image covers more than 20 percent and/or more than 50 percent of an extension of the light-sensitive surface transversely to the line direction, and/or that the image covers more than 50 percent of the light-sensitive surface.

14. The system according to claim 13, wherein the image distance corresponds to a distance between the illumination device and the dispersion lens, and the object distance corresponds to a distance between the dispersion lens and the light-sensitive surface.

15. A system, comprising:
a first communications unit including a controllable illumination device adapted to emit light modulated according to a predefined data flow; and
a second communications unit including a camera having an optical component and an image sensor, a light-sensitive surface of the image sensor including a plurality of lines of light-sensitive elements, the image sensor being arranged so that an image of the illumination device projected onto the light-sensitive surface of the image sensor by the optical component is unsharply imaged and/or covers more than half of the light-sensitive surface and is scanned line by line;
wherein the second communications unit includes a lenticular film arranged between the optical component and the first communications unit; and
wherein a preferred direction of the lenticular film is aligned transversely to a connecting line between the illumination device and the optical component.

16. A system, comprising:
a first communications unit including a controllable illumination device adapted to emit light modulated according to a predefined data flow; and
a second communications unit including a camera having an optical component and an image sensor, a light-sensitive surface of the image sensor including a plurality of lines of light-sensitive elements, the image sensor being arranged so that an image of the illumination device projected onto the light-sensitive surface of the image sensor by the optical component is unsharply imaged and/or covers more than half of the light-sensitive surface and is scanned line by line;
wherein the second communications unit has a portable communications device and a holder unit having a first and a second part, the first part being movable relative to the second part, the portable communications device is accommodated in the first part, and a lenticular film is accommodated in the second part.

17. The system according to claim 1, wherein the portable communications device includes a camera having a smartphone, a tablet, a smartwatch, and/or a laptop.

18. The system according to claim 16, wherein the first part is rotatable, pivotable, and/or displaceable relative to the second part.

19. The system according to claim 16, wherein the holder unit includes a smartphone case and/or a smartphone pocket.

20. A system, comprising:
a first communications unit including a controllable illumination device adapted to emit light modulated according to a predefined data flow; and
a second communications unit including a camera having an optical component and an image sensor, a light-sensitive surface of the image sensor including a plurality of lines of light-sensitive elements, the image sensor being arranged so that an image of the illumination device projected onto the light-sensitive surface of the image sensor by the optical component is unsharply imaged and/or covers more than half of the light-sensitive surface and is scanned line by line;
wherein a time characteristic of the data flow used for actuating the illumination device is displayed as a spatial brightness profile of the image recorded by the camera in a column direction and/or in a transverse direction to the line direction of the image sensor of the camera.

21. The system according to claim 20, wherein a spatial characteristic of a single image recorded by the camera represents only a time segment of the time characteristic and/or the spatial characteristic is only arranged in a region of a projected image of the illumination device.

22. A system, comprising:
a first communications unit including a controllable illumination device adapted to emit light modulated according to a predefined data flow; and
a second communications unit including a camera having an optical component and an image sensor, a light-sensitive surface of the image sensor including a plurality of lines of light-sensitive elements, the image sensor being arranged so that an image of the illumination device projected onto the light-sensitive surface of the image sensor by the optical component is unsharply imaged and/or covers more than half of the light-sensitive surface and is scanned line by line;
wherein a time characteristic of the data flow is periodic, having a period duration, and an image frequency during scanning and/or a whole number multiple of the image frequency during scanning is equal to an inverse value of the period duration.

23. A system, comprising:
a first communications unit including a controllable illumination device adapted to emit light modulated according to a predefined data flow; and
a second communications unit including a camera having an optical component and an image sensor, a light-sensitive surface of the image sensor including a plurality of lines of light-sensitive elements, the image sensor being arranged so that an image of the illumination device projected onto the light-sensitive surface of the image sensor by the optical component is unsharply imaged and/or covers more than half of the light-sensitive surface and is scanned line by line;
wherein the second communications unit includes a controllable illumination device and/or LED, and the first communications unit has a further light-sensitive element, bidirectional data transmission being possible between the first and second communications units.

24. A system, comprising:
a first communications unit including a controllable illumination device adapted to emit light modulated according to a predefined data flow; and
a second communications unit including a camera having an optical component and an image sensor, a light-sensitive surface of the image sensor including a plurality of lines of light-sensitive elements, the image sensor being arranged so that an image of the illumination device projected onto the light-sensitive surface of the image sensor by the optical component is unsharply imaged and/or covers more than half of the light-sensitive surface and is scanned line by line;
wherein the first communications unit is arranged electrical device, a converter adapted to feed an electric motor, an automatically movable intralogistics transport vehicle, a driverless transport system, and/or an automatically guided vehicle.

25. A method for operating a system that includes a first communications unit including a controllable illumination device adapted to emit light modulated according to a predefined data flow, and a second communications unit including a camera having an optical component and an image sensor, a light-sensitive surface of the image sensor including a plurality of lines of light-sensitive elements, the image sensor being arranged so that an image of the illumination device projected onto the light-sensitive surface of the image sensor by the optical component is unsharply imaged and/or covers more than half of the light-sensitive surface and is scanned line by line, comprising:

determining, for each line in a recorded image, a difference between a threshold value and a sum of brightness values of light-sensitive elements and/or pixels, a sequence of the differences indicating a time segment of a time characteristic of the data flow, as a spatial brightness profile transversely to a line direction, the threshold value being a mean value of the brightness values.

26. The method according to claim 25, wherein the second communications unit includes a lenticular film arranged between the optical component and the first communications unit.

* * * * *